United States Patent [19]
Ji

[11] Patent Number: 5,983,348
[45] Date of Patent: Nov. 9, 1999

[54] COMPUTER NETWORK MALICIOUS CODE SCANNER

[75] Inventor: Shuang Ji, Santa Clara, Calif.

[73] Assignee: Trend Micro Incorporated, Cupertino, Calif.

[21] Appl. No.: 08/926,619

[22] Filed: Sep. 10, 1997

[51] Int. Cl.⁶ .................................................. G06F 13/00
[52] U.S. Cl. ............................................ 713/200; 714/38
[58] Field of Search .............................. 395/186, 187.01, 395/188.01, 183.14, 183.13, 200.54, 200.55, 200.32; 380/3, 4, 23, 25; 713/200, 201, 202; 714/38, 37

[56] References Cited

U.S. PATENT DOCUMENTS

| | | | |
|---|---|---|---|
| 5,257,381 | 10/1993 | Cook | 395/700 |
| 5,359,659 | 10/1994 | Rosenthal | 380/4 |
| 5,390,232 | 2/1995 | Freeman et al. | 379/15 |
| 5,623,600 | 4/1997 | Ji et al. | 395/187.01 |
| 5,805,829 | 9/1998 | Cohen et al. | 395/200.32 |

*Primary Examiner*—Norman Michael Wright
*Attorney, Agent, or Firm*—Skjerven, Morrill MacPherson, Franklin & Friel LLP; Norman R. Klivans

[57] ABSTRACT

A network scanner for security checking of application programs (e.g. Java applets or Active X controls) received over the Internet or an Intranet has both static (pre-run time) and dynamic (run time) scanning. Static scanning at the HTTP proxy server identifies suspicious instructions and instruments them e.g. a pre-and-post filter instruction sequence or otherwise. The instrumented applet is then transferred to the client (web browser) together with security monitoring code. During run time at the client, the instrumented instructions are thereby monitored for security policy violations, and execution of an instruction is prevented in the event of such a violation.

34 Claims, 2 Drawing Sheets

COMPUTER NETWORK MALICIOUS CODE SCANNER

FIELD OF THE INVENTION

This invention pertains to computer networks and specifically to detecting and preventing operation of computer viruses and other types of malicious computer code.

BACKGROUND

With the rapid development of the Internet, Intranet, and network computing, applications (application programs) are distributed more and more via such networks, instead of via physical storage media. Many associated distribution technologies are available, such as Java and Active X. Therefore objects with both data and code flow around the network and have seamless integration with local computer resources. However, this also poses a great security risk to users. Code (software) from unknown origin is thereby executed on local computers and given access to local resources such as the hard disk drive in a user's computer. In a world wide web browser environment, such code is often automatically executed and the user might not even have a chance to be forewarned about any security risks (e.g. presence of computer viruses) he bears. Attempts have been made to reduce such risks; see Ji et al., U.S. Pat. No. 5,623,600, incorporated by reference in its entirety.

Active X technology, like Java, distributes code that can access local system resources directly. The web browser cannot monitor or block such accesses. Such an applet (application) can do virtually anything that a conventional program, for instance, a virus, is capable of doing. Microsoft Corp. and others have attempted to address this problem by using digital signature technology, whereby a special algorithm generates a digital profile of the applet. The profile is attached to the applet. When an applet is downloaded from the Internet, a verification algorithm is run on the applet and the digital profile to ensure that the applet code has not been modified after the signing. If an applet is signed by a known signature, it is considered safe.

However, no analysis of the code is done to check the behavior of the applet. It is not difficult to obtain a signature from a reputable source, since the signature can be applied for online. It has occurred that a person has created an Active X applet that was authenticated by Microsoft but contains malicious code. (Malicious code refers to viruses and other problematic software. A virus is a program intended to replicate and damage operation of a computer system without the user's knowledge or permission. In the Internet/Java environment, the replication aspect may not be present, hence the term "malicious code" broadly referring to such damaging software even if it does not replicate.)

Java being an interpreted language, Java code can be monitored at run-time. Most web browsers block attempts to access local resources by Java applets, which protects the local computer to a certain extent. However, as the popularity of Intranets (private Internets) increases, more and more applets need to have access to local computers. Such restrictions posed by the web browsers are becoming rather inconvenient. As a result, web browsers are relaxing their security policies. Netscape Communicator is a web browser that now gives users the ability to selectively run applets with known security risks. Again, decisions are made based on trust, with no code analysis done.

Hence scanning programs with the ability to analyze and monitor applets are in need to protect users.

At least three Java applet scanners are currently available commercially: SurfinShield and SurfinGate, both from Finjan, and Cage from Digitivity, Inc. SurfinShield is a client-side (user) solution. A copy of SurfinShield must be installed on every computer which is running a web browser. SurfinShield replaces some of the Java library functions included in the browser that may pose security risks with its own. This way, it can trap all such calls and block them if necessary.

SurfinShield provides run-time monitoring. It introduces almost no performance overhead on applet startup and execution. It is able to trap all security breach attempts, if a correct set of Java library functions is replaced. However, it is still difficult to keep track of the states of individual applets if a series of actions must be performed by the instances before they can be determined dangerous this way, because the scanner is activated rather passively by the applets.

Since every computer in an organization needs a copy of the SurfinShield software, it is expensive to deploy. Also, installing a new release of the product involves updating on every computer, imposing a significant administrative burden.

Because SurfinShield replaces library functions of browsers, it is also browser-dependent; a minor browser upgrade may prevent operation. SufinGate is a server solution that is installed on an HTTP proxy server. Therefore, one copy of the software can protect all the computers proxied by that server. Unlike SufinShield, SurfinGate only scans the applet code statically. If it detects that one or more insecure functions might be called during the execution of the applet, it blocks the applet. Its scanning algorithm is rather slow. To solve this problem, SurfinGate maintains an applet profile database. Each applet is given an ID which is its URL. Once an applet is scanned, an entry is added to the database with its applet ID and the insecure functions it might try to access. When this applet is downloaded again, the security profile is taken from the database to determine the behavior of the applet. No analysis is redone. This means that if a previously safe applet is modified and still has the same URL, SurfinGate will fail to rescan it and let it pass through. Also, because the size of the database is ever-growing, its maintenance becomes a problem over time.

Cage is also a server solution that is installed on an HTTP proxy server, and provides run-time monitoring and yet avoids client-side installations or changes. It is similar to X Windows. All workstations protected by the server serve as X terminals and only provide graphical presentation functionality. When an applet is downloaded to Cage, it stops at the Cage server and only a GUI (graphical user interface) agent in the form of an applet is passed back to the browser. The applet is then run on the Cage server. GUI requests are passed to the agent on the client, which draws the presentation for the user. Therefore, it appears to users that the applets are actually running locally.

This approach creates a heavy load on the server, since all the applets in the protected domain run on the server and all the potentially powerful computers are used as graphical terminals only. Also, reasonable requests to access local resources (as in Intranet applications) are almost impossible to honor because the server does not have direct access to resources on individual workstations.

These products fail to create any balance between static scanning and run-time monitoring. SurfinShield employs run-time monitoring, SurfinGate uses static scanning, and Cage utilizes emulated run-time monitoring. Since static scanning is usually done on the server and run-time monitoring on the client, this imbalance also causes an imbalance between the load of the server and the client. To distribute the load between the client and the server evenly, the present inventor has determined that a combination of static scanning and run-time monitoring is needed.

SUMMARY

This disclosure is directed to an applet scanner that runs e.g. as an HTTP proxy server and does not require any client-side modification. The scanner combines static scanning and run-time monitoring and does not cause a heavy load on the server. It also does not introduce significant performance overhead during the execution of applets. The scanner provides configurable security policy functionality, and can be deployed as a client-side solution with appropriate modifications.

Thereby in accordance with the invention a scanner (for a virus or other malicious code) provides both static and dynamic scanning for application programs, e.g. Java applets or ActiveX controls. The applets or controls (hereinafter collectively referred to as applets) are conventionally received from e.g. the Internet or an Intranet at a conventional server. At this point the applets are statically scanned at the server by the scanner looking for particular instructions which may be problematic in a security context. The identified problematic instructions are then each instrumented, e.g. special code is inserted before and after each problematic instruction, where the special code calls respectively a prefilter and a post filter. Alternatively, the instrumentation involves replacing the problematic instruction with another instruction which calls a supplied function.

The instrumented applet is then downloaded from the server to the client (local computer), at which time the applet code is conventionally interpreted by the client web browser and it begins to be executed. As the applet code is executed, each instrumented instruction is monitored by the web browser using a monitor package which is part of the scanner and delivered to the client side. Upon execution, each instrumented instruction is subject to a security check. If the security policy (which has been pre-established) is violated, that particular instruction which violates the security policy is not executed, and instead a report is made and execution continues, if appropriate, with the next instruction.

More broadly, the present invention is directed to delivering what is referred to as a "live agent" (e.g., a security monitoring package) along with e.g. an applet that contains suspicious instructions during a network transfer (e.g. downloading to a client), the monitoring package being intended to prevent execution of the suspicious instructions. The suspicious instructions each may (or may not) be instrumented as described above; the instrumentation involves altering suspicious instructions such as by adding code (such as the pre-and post-filter calls) or altering the suspicious instructions by replacing any suspicious instructions with other instructions.

DETAILED DESCRIPTION

Figure 1:
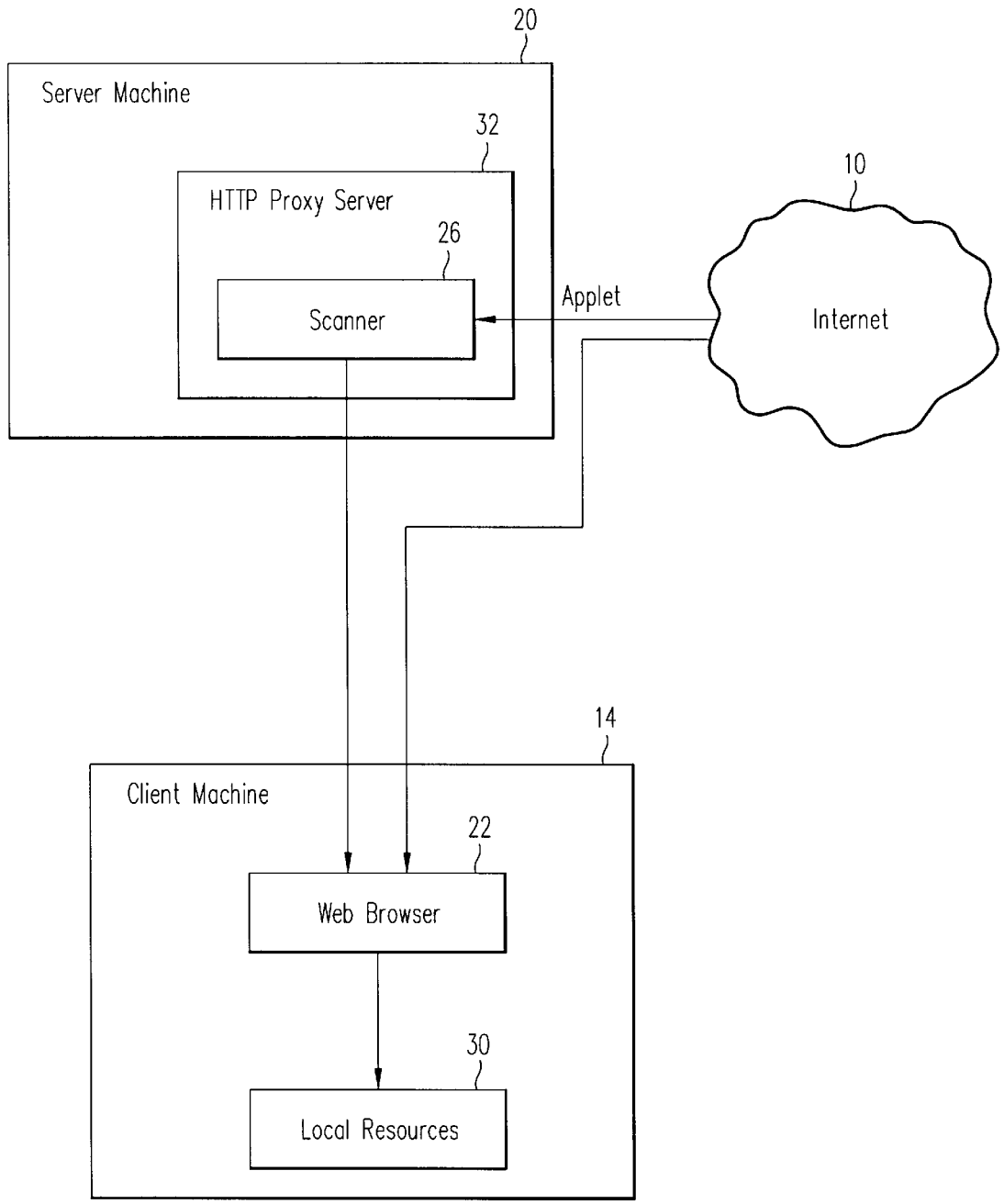
FIG. 1 shows diagramatically use of a scanner in accordance with this invention.

Several characteristics of the well known Java language and applets are pertinent to the present scanning method and apparatus. Java is an interpreted, dynamic-linking language.

Only the application modules are distributed, and all the standard library functions are provided by the interpreter, for instance a web browser. Because Java byte code is platform-independent, applets have to use some of the standard library functions to access operating system resources.

This creates two opportunities in accordance with the invention to detect attempts to use operating system resources. First, one can "trick" applets into calling particular functions supplied by the scanner during the dynamic linking stage. This is done by replacing the browser Java library routines with the scanner's monitoring routines of the same name. Second, since invocations of such functions have to be resolved at run-time, symbolic names of these functions are kept in the Java applet module. The scanner can detect possible use of these functions by looking at the static code itself. The first opportunity provides run-time monitoring. It is the most definitive method to determine the security risks posed by an applet.

The second opportunity enables statically scanning an applet, without running it, to detect possible security risks. If a set of insecure functions is properly defined and an applet never calls any function in the set, the applet can be assumed to be safe. However, this static scanning method is not definitive, since an applet might show different behavior given different user input. Under certain conditions, the instruction in the applet that makes the function call may never be executed. If static scanning is used without run-time monitoring, many such "false alarms" of security risks are produced undesirably.

After the code of an applet is downloaded, e.g. via the Internet to a client platform (local computer), an instance of the applet is created in the conventional Java "virtual machine" in the web browser (client) running on that local computer. Different instances of the same applet might produce different results given different inputs. A running instance of an applet is conventionally called a session; sessions are strictly run-time entities. Static scanning cannot analyze sessions because static scanning does not let the applet run. Sessions are important because an instance of an applet will often perform a series of suspicious tasks before it can be determined dangerous (i.e., in violation of the security policy). Such state information needs to be associated with the sessions. The present applet scanner thereby stops sessions instead of blocking execution of the entire applet.

A security policy defines what functions an applet needs to perform to be considered a security risk. Examples of security policies include preventing(1) applets from any file access, or (2) file access in a certain directory, or (3) creating certain Java objects. An applet scanner in accordance with the invention may allow different security policies for different clients, for different users, and for applets from different origins.

FIG. 1 is a high level block diagram illustrating the present scanner in the context of conventional elements. The Internet (or an Intranet) is shown generally at 10. The client machine or platform (computer) 14, which is typically a personal computer, is connected to the Internet 10 via a conventional proxy server machine (computer) 20. Client machine 14 also includes local resources 30, e.g. files stored on a disk drive. A conventional web browser 22 is software that is installed on the client machine 14. It is to be understood that each of these elements is complex, but except for the presently disclosed features is conventional.

Upon receipt of a particular Java applet, the HTTP proxy server 32, which is software running on server machine 20 and which has associated scanner software 26, then scans the applet and instruments it using an instrumenter 28 which is part of the scanner software 26. (Downloaded non-applets are not scanned.) The instrumented applet is subject to a special digital signer which is an (optional) part of the scanner 26. The scanned (instrumented) applet, which has been digitally signed is then downloaded to the web browser 22 in the client 14. The applet is then conventionally interpreted by the web browser 22 and its instructions are executed. The execution is monitored by the monitor package software, also downloaded from scanner 26, in the web browser 22 in accordance with this invention for security purposes. Thus static scanning is performed by the HTTP proxy server 32 and dynamic scanning by the web browser 22.

The present applet scanner thus uses applet instrumentation technology, that is, for Java applets it alters the Java applet byte code sequence during downloading of the applet to the server 32. After the Java applet byte code sequence has been downloaded, the static (pre-run time) scanning is performed on the applet by the scanner 26. If an instruction (a suspicious instruction) that calls an insecure function (as determined by a predefined set of such functions) is found during this static scanning, a first instruction sequence (pre-filter) is inserted before that instruction and a second instruction sequence (post-filter) after that instruction by the instruments.

An example of such a suspicious Java function is "Java.IO.File.list" which may list the contents of a client (local) directory 30, e.g. a directory on the client machine 14 hard disk drive. The first instruction sequence generates a call to a pre-filter function provided by the scanner 26, signaling that an insecure (suspicious) function is to be invoked. The pre-filter checks the security policy associated with the scanner 26 and decides whether this particular instruction ("call") is allowed. The second instruction sequence generates a call to a post-filter function also provided by the scanner. It also reports the result of the call to the post-filter function. Both the pre- and post-filter functions update the session state to be used by the security policy. The static scanning and instrumentation are both performed on the HTTP proxy server 32.

The following is pseudo-code for the instrumentation process:

```
instrument (JavaClassFile classfile)
{
        extract constant pool from classfile;
        extract functions from classfile;
        for each function
{
        for each function
        {
        if( the instruction is a function call
                AND the target of the call is a pre-defined set
                of suspicious functions)
        {
        output an instruction sequence which generates a
        function call to a pre-monitor function, with the
        name of the suspicious function, parameters to the
        suspicious function, and possibly other
        information about his suspicious function
        invocation as the parameters;
        output the original instruction;
        output an instruction sequence which generates a
        function call to a post-monitor function, with the
        result of the suspicious function invocation and
        possibly other related information as parameters;
        }
```

```
        else
        {
        output the original instruction;
        }
    }
  }
}
```

Examples of pre- and post-monitor functions are:
(1) to disallow any directory listing access:

```
pre-filter(function_name, parameters)
{
if (function_name == "java.io.File.list")
throw new SecurityException();
}
post-filter(result)
{
}
```

(2) To protect files under c:\temp from directory listing access:

```
pre-filter(function_name, parameters)
{
if
(function_name == "java.io.File.list")
        {
        extract the name of the file to be read from
parameters;
        if the directory to be listed is under c:\temp)
        throw new SecurityException();
{
}
post-filter(result)
{
}
```

The pre and post filter and monitoring package security policy functions) are combined with the instrumented applet code in a single JAR (Java archive) file format at the server 32, and downloaded to the web browser 22 in client machine 14. From this point on, the server 32 is virtually disconnected from this server-client session. All the monitoring and applet code is executed in the web browser 22 in the client machine 14. The only time that the server 32 may be again involved during this particular session is when the applet is determined to be dangerous (i.e. including malicious code that violates the security policy) or the applet has completed execution, and a report is sent back to the server 32 by the monitoring code in the scanner 26. A report is optional in this second case.

This approach minimizes the overhead on both server 32 and browser 14. The only work performed on the server 32 is to identify suspicious applet instructions and instrument them, which is usually performed by a one time pass over the applet code. To the client web browser 22, the only overhead is some occasional calls to the scanner monitoring functions, which update session statistics and check security policies. This achieves an optimum distribution of scanning and monitoring between the server 32 and the client web browser 22. Also, the server 32 maintains no state information about active sessions in the set of host associated with the proxy server instead the session state information is maintained locally at client machine 14 by the downloaded monitoring functions.

This approach may damage the integrity of externally digitally signed (authenticated) applets, since the content of the applets is changed by the instrumentation. However, this can also be used as an advantage because using the present scanner, a new set of authenticated signatures can be set and enforced for the entire domain as further described below.

Figure 2:
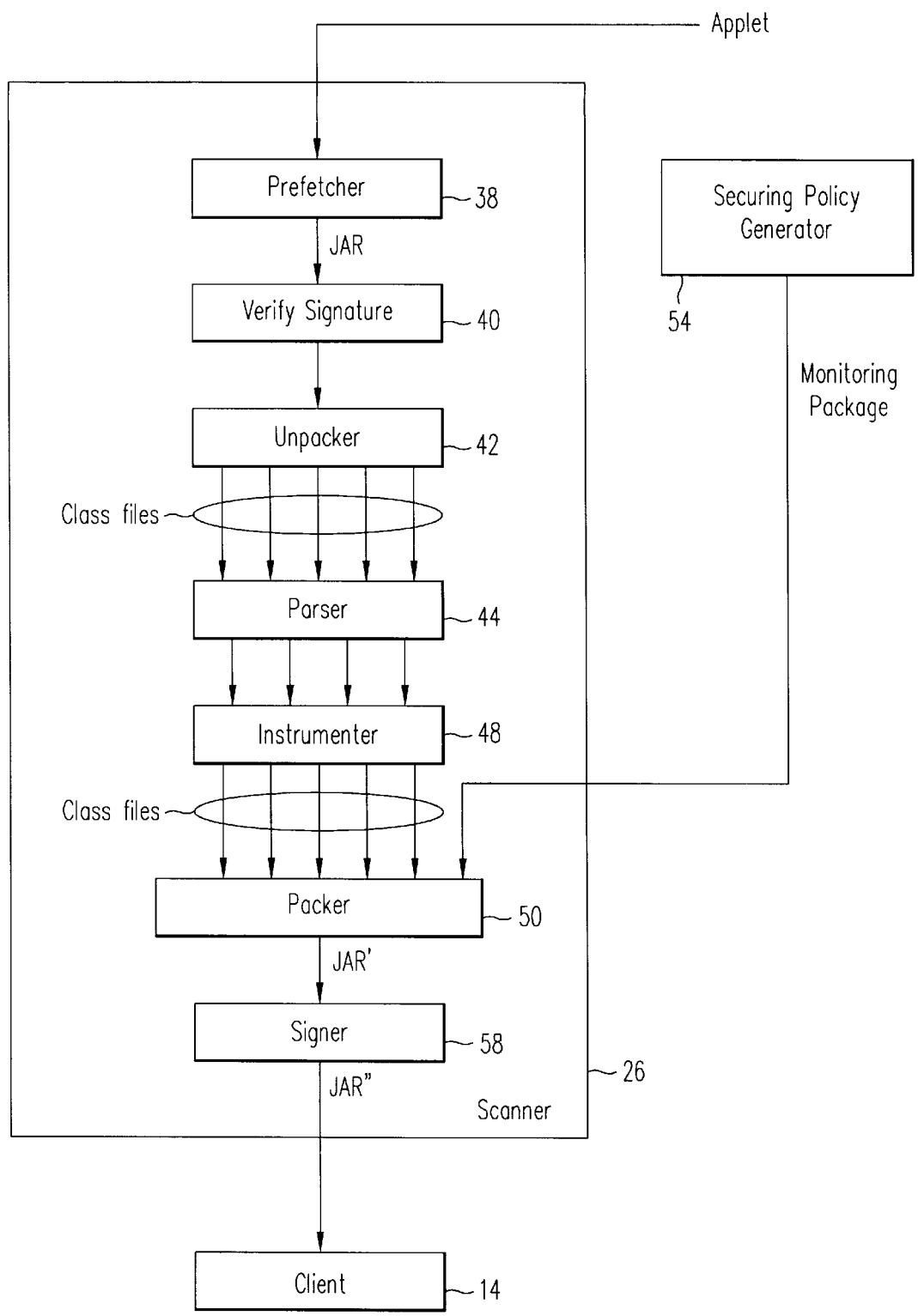
FIG. 2 shows detail of the FIG. 1 scanner.

Operation of scanner 26 and its various (software) components is better understood with reference to FIG. 2, showing greater detail than FIG. 1.

An applet pre-fetcher component 38 fetches from the Internet 10 all the dependency files required by a Java class file, if they are not already packed into a JAR file. This is important because the goal is to attach the scanner monitor package to a session only once.

A Java applet may contain more than one code module, or class file. Heretofore this disclosure has assumed that all the class files are packed in one JAR file and downloaded once. One monitoring package is attached to the JAR file and every instantiation of this package on the client web browser 22 marks a unique session. However, if the class files are not packed together and are downloaded on an as-needed basis during applet execution, multiple instrumentation will occur and multiple instances of the monitoring package for the same session are created on the client. This creates a problem of how to maintain information on session states. To solve this problem, the pre-fetcher 38 pre-fetches the dependency class files during the static scanning of the main applet code module. The dependency class files are (see below) instrumented once, packed together, and delivered to the client.

Upon receiving a (signed) applet, the signal verifier component 40 then verifies the signature and its integrity, as conventional, to decide whether to accept this applet.

Next, the unpacker 42 component extracts the class files from the JAR file. JAR uses ZIP (compression) format.

Java class parser component 44 then parses each Java class file. Parser 44 conventionally extracts the instruction sequence of the Java functions.

The Java instrumenter component 48 instruments the Java class files, e.g. by inserting monitoring instructions (e.g. pre and post filter calls) before and after each suspicious instruction, as described above.

The monitor package contains monitoring functions that are delivered from the server 32 to the client web browser 22 with the instrumental applet and are invoked by the instrumentation code in the applet. The monitor package also creates a unique session upon instantiation. It also contains a security policy checker (supplied by security policy generator component 54) to determine whether the applet being scanned violates the security policy, given the monitoring information.

The security policy generator component 54 generates the security checker code included in the monitor package, from a set of predefined security policies. Different clients, users, and applets may have different security policies. The security policy generator 54 may run on server machine 20 or another computer. In addition, security policies can be configured by an administrator of the system. A simple security policy is to assign different weights to monitored functions and make sure the security weight of a session does not exceed a preset threshold. A more sophisticated security policy checks the file or resource the applet is trying to access at run time and prompts the user whether to allow the access. Hence the security policy broadly is a state machine to detect security policy violations upon attempted instruction execution.

The security policy generator 54 can operate outside the run-time instrumenter component 48 when the security policy is being created. The instrumenter component 48 can then directly use the byte code. Thereby any performance limitations of the security policy generator component 54 become less important.

Next, packer 50 creates a new JAR file (JAR') from the instrumented class files and the monitoring package.

The digital signer component 58 digitally signs the applet (now JAR"), with a digital signature unique to the particular scanner 26, for authentication in the local domain. The applet JAR" is then transferred to the client machine 14 for execution. Thus the only signature that a client needs to recognize is the digital signature of the signer component 58 in the scanner 26. This pre-verification simplifies system administration and reduces risks to unsophisticated users who might otherwise accidentally accept applets with unauthorized signatures.

In one embodiment, the components of scanner 26 are each implemented in Java. Some (or all) of the functions ("components") of the scanner 26 described above may be implemented in native (non-Java) code to improve performance. The actual scanner code is not given here; it can be readily written by one of ordinary skill in the art in light of this disclosure.

This disclosure is illustrative and not limiting, further modifications will be apparent to one skilled in the art and are intended to fall within the scope of the appended claims.

I claim:

1. A method of detecting and preventing execution of instructions in an application program provided from a computer network, comprising:

providing the application program over the computer network;

determining whether the provided application program includes any instructions that are members of a particular set of instructions;

executing the application program if it is determined that no members of the set are included in the application program;

if it is determined that an instruction is a member of the set, then altering the application program, thereby allowing monitoring of execution of the instruction, wherein the altering includes inserting a first predefined call before the instruction and a second predefined call after the instruction; and wherein the first or second predefined call changes a session state of the application program.

2. The method of claim 1, further comprising associating monitoring code with the application program.

3. The method of claim 1, wherein the altering includes replacing the instruction with a predefined second instruction.

4. The method of claim 1, wherein the application program is an applet.

5. The method of claim 4, wherein the applet is in the Java language.

6. The method of claim 1, wherein the computer network is an Intranet or the Internet.

7. The method of claim 1 wherein the first predefined call is a call to check a security policy.

8. The method of claim 7, wherein the security policy is a state machine.

9. The method of claim 1, wherein the inserting is repeated for each instruction in the application program that is a member of the particular set.

10. The method of claim 1, wherein the particular set of instructions includes instructions that access a predefined set of files.

11. The method of claim 1, wherein the computer network includes a server and a client coupled to the server, and wherein the altering takes place at the server, wherein the executing the application program takes place at the client.

12. The method of claim 1, wherein the instructions are problematic instructions.

13. The method of claim 1, wherein the application program is altered at the point of the instruction.

14. A method of detecting and preventing execution of instructions in an application program provided from a computer network comprising:

providing the application program over the computer network;

determining whether the provided application program includes any instructions that are members of a particular set of instructions;

executing the application program if it is determined that no members of the set are included in the application program;

if it is determined that an instruction is a member of the set, then altering the application program, thereby allowing monitoring of execution of the instruction;

determining if the application program includes an authentication;

verifying the authentication; and replacing the verified authentication with a second authentication.

15. A method of detecting and preventing execution of instructions in an application program provided from a computer network, comprising:

providing the application program over the computer network;

determining whether the provided application program includes any instructions that are members of a particular set of instructions;

executing the application program if it is determined that no members of the set are included in the application program;

if it is determined that an instruction is a member of the set, then altering the application program, thereby allowing monitoring of execution of the instruction;

providing all dependency files associated with the application program;

providing a single monitoring package performing the step of determining for the application program and its associated dependency files; and executing the application program and its associated dependency files.

16. A scanner for detecting and preventing execution of instructions in an application program provided from a computer network, wherein the scanner determines whether the provided application program includes any instructions that are members of a particular set of instructions, allowing execution of the application program if it is determined that no members of the set are included in the application program; and comprising:

an instrumenter which alters the application program at an instruction which is determined to be a member of the set, thereby allowing monitoring of execution of such instructions;

wherein the instrumenter inserts a first predefined call before the instruction and a second predefined call after the instruction; and wherein the first or second predefined call changes a session state of the application program.

17. The scanner of claim 16, further comprising a packer which associates monitoring code with the application program.

18. The scanner of claim 16, wherein the instrumenter replaces the instruction with a predefined second instruction.

19. The scanner of claim 16, wherein the application program is an applet.

20. The scanner of claim 19, wherein the applet is in the Java language.

21. The scanner of claim 16, wherein the computer network is an Intranet or the Internet.

22. The scanner of claim 16, wherein the first predefined call is a call to check a security policy.

23. The scanner of claim 22, wherein the security policy is a state machine.

24. The scanner of claim 16, wherein the instrumenter repeats the inserting for each instruction in the application program that is a member of the particular set.

25. The scanner of claim 16, wherein the particular set of instructions includes instructions that access a predefined set of files.

26. The scanner of claim 16, wherein the computer network includes a server and a client coupled to the server, wherein the altering by the instrumenter takes place at the server, and wherein the executing the application program takes place at the client.

27. The scanner of claim 16, wherein the instructions that are members of the particular set are problematic instructions.

28. The scanner of claim 16, wherein the alteration is at the point of the instruction.

29. A scanner for detecting and preventing execution of instructions in an application program provided from a computer network, wherein the scanner determines whether the provided application program includes any instructions that are members of a particular set of instructions, allowing execution of the application program if it is determined that no members of the set are included in the application program; and comprising:

an instrumenter which alters the application program at an instruction which is determined to be a member of the set, thereby allowing monitoring of execution of such instruction;

a verifier which determines if the application program includes an authentication and verifies the authentication; and a signer which replaces the verified authentication with a second authentication.

30. A scanner for detecting and preventing execution of instructions in an application program provided from a computer network, wherein the scanner determines whether the provided application program includes any instructions that are members of a particular set of instructions, allowing execution of the application program if it is determined that no members of the set are included in the application program; and comprising:

an instrumenter which alters the application program at an instruction which is determined to be a member of the set, thereby allowing monitoring of execution of such instruction;

a prefetcher which fetches all dependency files associated with the application program; and a security policy generator which provides a single monitoring package for the application program and its associated dependency files.

31. A method of detecting and preventing execution of instructions in an application program provided from a computer network, comprising:

providing the application program over the computer network;

determining whether the provided application program includes any instructions that are members of a particular set of instructions;

executing the application program if it is determined that no members of the set are included in the application program;

if it is determined that an instruction is a member of the set, then altering the application program, thereby allowing monitoring of execution of the instruction;

wherein the computer network includes a server and a client coupled to the server, and wherein the altering takes place at the server, wherein the executing the application program takes place at the client; and performing the monitoring at the client.

32. A method of detecting and preventing execution of instructions in an application program provided from a computer network, comprising:

providing the application program over the computer network;

determining whether the provided application program includes any instructions that are members of a particular set of instructions;

executing the application program if it is determined that no members of the set are included in the application program;

if it is determined that an instruction is a member of the set, then altering the application program, thereby allowing monitoring of execution of the instruction, and carrying out the method for each of a plurality of application programs as each application program is provided from the computer network.

33. A scanner for detecting and preventing execution of instructions in an application program provided from a computer network, wherein the scanner determines whether the provided application program includes any instructions that are members of a particular set of instructions, allowing execution of the application program if it is determined that no members of the set are included in the application program; and comprising:

an instrumenter which alters the application program at an instruction which is determined to be a member of the set, thereby allowing monitoring of execution of such instruction;

wherein the computer network includes a server and a client coupled to the server, wherein the altering by the instrumenter takes place at the server, and wherein the executing the application program takes place at the client; and wherein the monitoring is performed at the client.

34. A scanner for detecting and preventing execution of instructions in an application program provided from a computer network, wherein the scanner determines whether the provided application program includes any instructions that are members of a particular set of instructions, allowing execution of the application program if it is determined that no members of the set are included in the application program; and comprising:

an instrumenter which alters the application program at an instruction which is determined to be a member of the set, thereby allowing monitoring of execution of such instruction; and wherein the instrumenter alters each of a plurality of application programs as each application program is provided from the computer network.

* * * * *